United States Patent [19]

Reinhard

[11] Patent Number: 5,647,487
[45] Date of Patent: Jul. 15, 1997

[54] DEVICE FOR THE STORAGE OF CASSETTES

[76] Inventor: Alfred Reinhard, Gartenstrasse 10, CH 8800 Thalwil, Switzerland

[21] Appl. No.: 406,970

[22] PCT Filed: Jul. 5, 1994

[86] PCT No.: PCT/CH94/00142

§ 371 Date: Mar. 29, 1995

§ 102(e) Date: Mar. 29, 1995

[87] PCT Pub. No.: WO95/30224

PCT Pub. Date: Nov. 9, 1995

[30] Foreign Application Priority Data

May 2, 1994 [CH] Switzerland ............... 01 351/94-3

[51] Int. Cl.$^6$ .......................................... A47F 7/00
[52] U.S. Cl. .................. 211/40; 211/194; 211/41.12; 312/9.9
[58] Field of Search ................ 211/40, 41, 194, 211/189; 312/9.9; 206/307.1, 308.1, 308.3, 387.15; 446/106, 122

[56] References Cited

U.S. PATENT DOCUMENTS

| 1,409,392 | 3/1922 | Morgan | 211/40 |
| 3,008,581 | 11/1961 | Kohler | 211/11 |
| 5,078,278 | 1/1992 | Edmark | 211/194 X |
| 5,191,983 | 3/1993 | Hardy | 211/40 |
| 5,370,242 | 12/1994 | Huang | 211/194 X |
| 5,370,243 | 12/1994 | Rosario | 211/194 X |

FOREIGN PATENT DOCUMENTS

| 0333271 | 9/1989 | European Pat. Off. . | |
| 0385807 | 9/1990 | European Pat. Off. . | |
| 0415696 | 3/1991 | European Pat. Off. . | |
| 9300261 | 2/1993 | Netherlands | 211/194 X |

*Primary Examiner*—Robert W. Gibson, Jr.
*Attorney, Agent, or Firm*—Watson Cole Stevens Davis, P.L.L.C.

[57] ABSTRACT

A device for the storage of cassettes, specifically CD-cassettes, formed of a wall assembly of a plurality of identical bar elements (1) with plug and bores at their planar end areas (5) and pin for connecting the bar elements in a staggered manner having gaps. The bar elements (1) form in a preferred kind at a rack-like arrangement of respective two pairs of bar elements (1) transversely over two bar elements (1) located below and at a stacking above each other in several layers a tower-like rack (10) with slide-in compartments (11) formed by the gaps for one respective cassette (9) between two respective bar elements (1) located above each other. Each bar element includes at the steplike stepped inner longitudinal side (6) at the center an abutment (7) formed by the step for limiting the slide-in path of the cassettes to be slid in from the opposite side. By way of the bar elements any arbitrary frame height for an optimal utilization of given space condition can be produced.

15 Claims, 3 Drawing Sheets

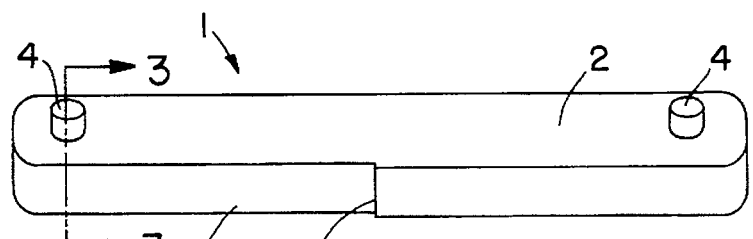
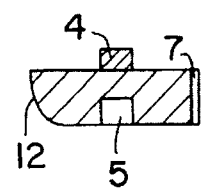
FIG. 1    FIG. 3
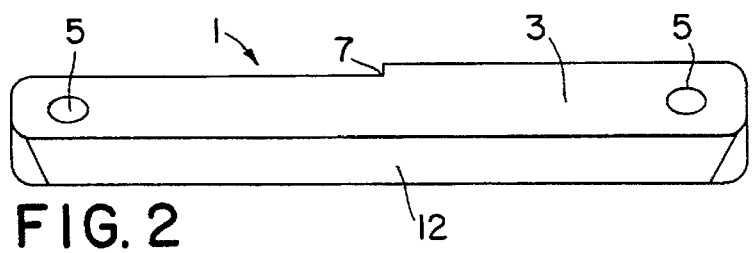
FIG. 2
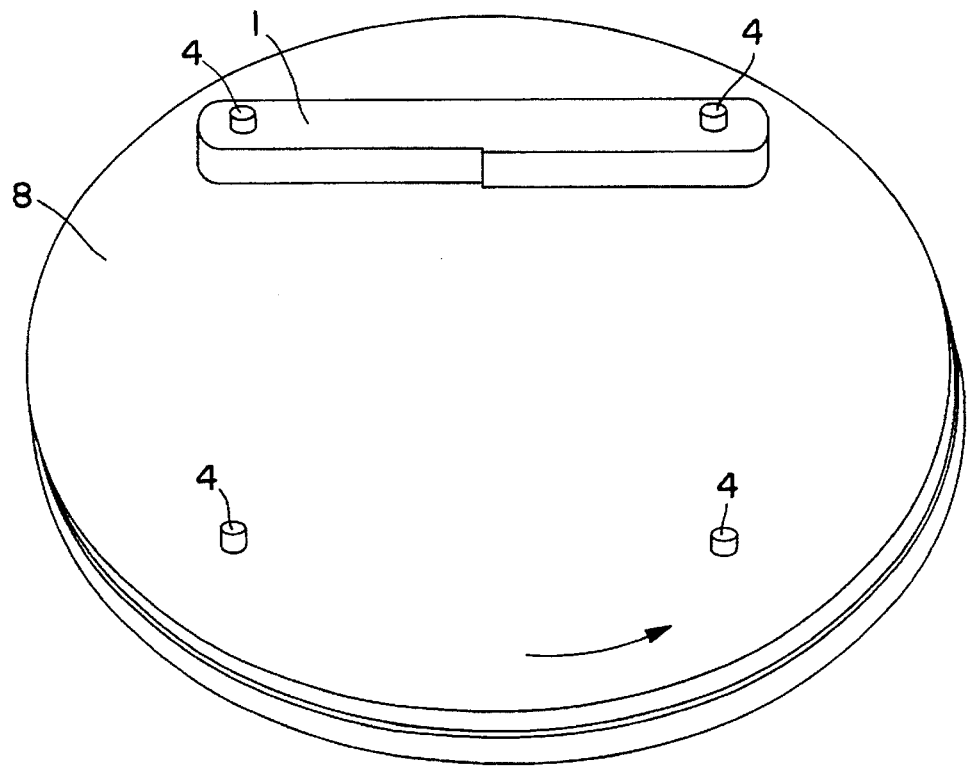
FIG. 4
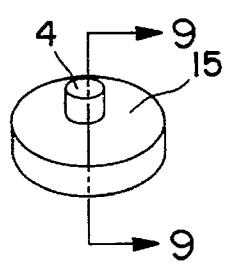
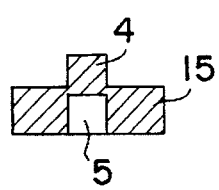
FIG. 8    FIG. 9

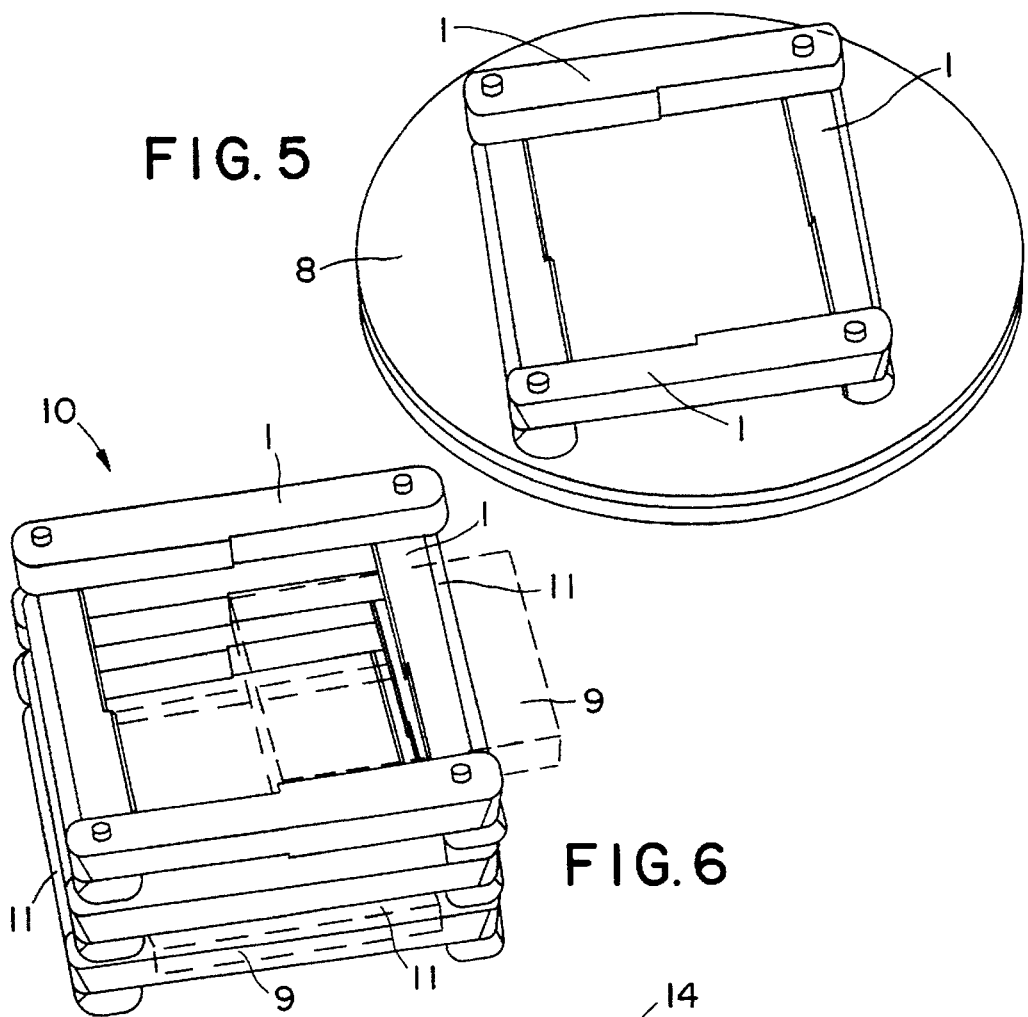
FIG. 5
FIG. 6
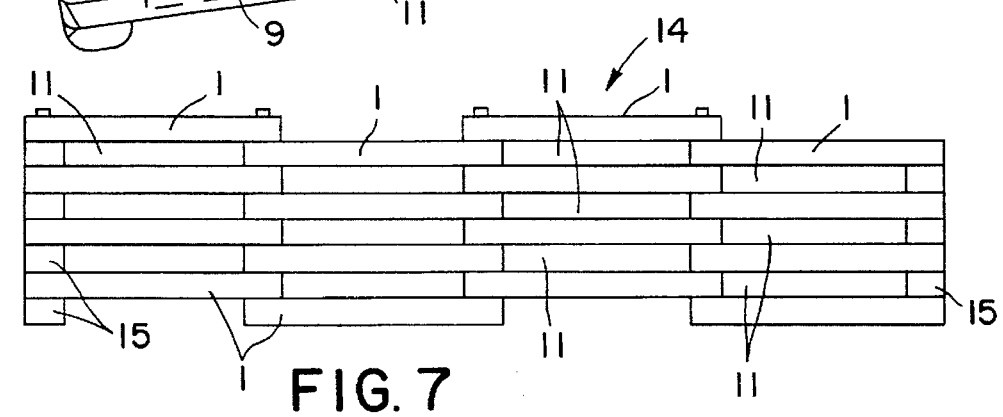
FIG. 7
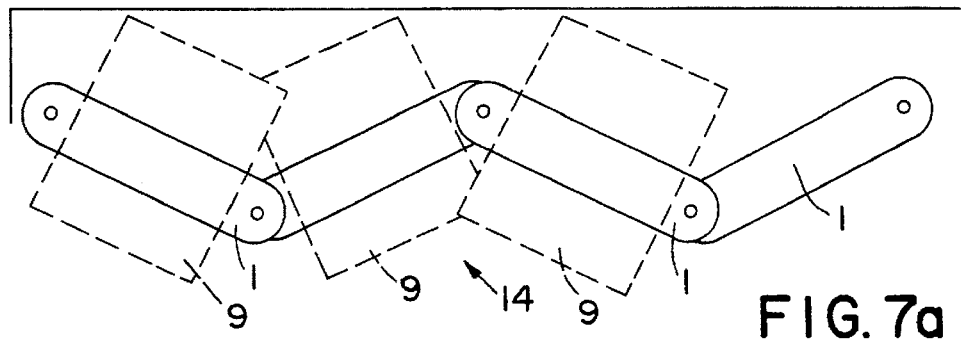
FIG. 7a

DEVICE FOR THE STORAGE OF CASSETTES

BACKGROUND AND SUMMARY OF THE INVENTION

The invention relates to a device for the storage of cassettes, specifically CD-cassettes, for a contactless individual retrieval. Devices of this kind are known in quite differing designs, consisting for instance of a column-like structure of metal comprising a plurality of supporting ledges connected to each other, of cases with drawers, of single receptacles which can be swung out, or of special profiled ledges for a standing arranging of cassettes. For a large number of cassettes they are designed either too high or then not stable or as a box taking up a large volume of space. If one wants to place them into a bookshelf one has often difficulties regarding space in the hight or width or one must leave a lot of space not utilized due to the dimensions of the shelf.

The invention was based on the object to provide a device for the storage of cassettes, specifically of CD-cassettes, which every user can assemble by himself tailored individually to the conditions of the space in his premises, for instance in a shelf, and which allows a storing of more cassettes in a given space volume than known devices and which additionally is low in price.

In order to solve the object the device includes a plurality of bar elements which include plug-in connecting means near their opposite ends to enable them to be interconnected to provide a plurality of compartments in which the cassettes can be slidably positioned. The device possesses the advantage that it is possible to assemble with the single elements a device of any arbitrary height for the storing of cassettes lying planarly on top of each other, and that the individual element can be bought later in a necessary number. Any differing shelf height can be fully utilized for the storing of the device and no tools are needed for assembling. Due to the high stability of the individual elements, there also is no danger that, such as in case of known devices consisting of a plastic material, they can no longer function due to a damaging thereof.

BRIEF DESCRIPTION OF THE DRAWINGS

An embodiment of the invention will hereinafter be explained closer based on the drawings. There is shown in:

FIG. 1 a bar element in a perspective view from above;

FIG. 2 the bar element of FIG. 1 in a perspective view from below;

FIG. 3 a section through the bar element according to line 3—3 in FIG. 1;

FIG. 4 a turntable for a rack of bar elements to be assembled thereon;

FIG. 5 a deck consisting of four bar elements which can be assembled by a plug-in coupling, which can be enlarged upwards and which is assembled on a turntable, in a perspective view;

FIG. 6 the tower-like rack consisting of bar elements, in a perspective view;

FIG. 7 and FIG. 7a front view and top view of an embodiment of the rack in form of a several times angulated wall of bar elements;

FIG. 8 is a front view and vertical section an intermediate piece necessary for the assembling of a bar element rack according to FIG. 7;

FIG. 9 is a vertical section of the intermediate piece of FIG. 8 as seen along line 9—9;

Figure 10:
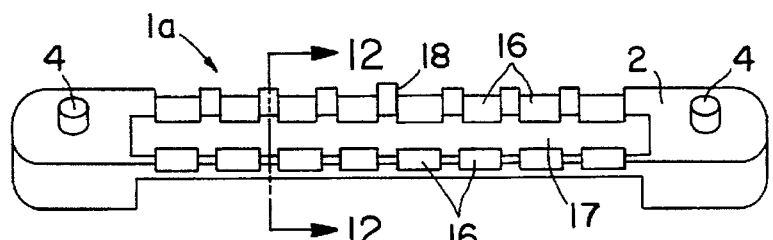
FIG. 10 a modified embodiment of the bar element in a perspective view from above.

The bar element 1 according to FIG. 1 is a substantially square-shaped elongate body with a planar upper side 2 and a planar bottom side 3. In the two end areas of the bar element projecting pins or studs 4 are formed at the upper side 2 and at the bottom side 3 round bores 5 aligned axially therewith, into which studs of a bar element located beneath engage with a snug fit such to form a firm plug connection.

Pins and bores are produced simultaneously with the production of the bar element of a plastic material, preferably with a injection molding method. During the production a step 7 is formed, furthermore, at the inner narrow side 6 in the center, which acts as abutment for the limiting of the sliding-in path of a cassette, of which two can be slid in at each deck from two opposite sides such as illustrated in FIG. 6 by broken lines. FIG. 5 discloses that respective two identical bar elements 1 are placed in a frame-like arrangement transverse over two bar elements 1 located below and interconnected by means of the plug-in connection by pins 4 and bores 5 and form on the turntable 8 illustrated alone in FIG. 4 mounted thereon according to the same principle by means of pins 4 located thereon a slide-in deck of a rack 10 as shown in FIG. 6 consisting of a plurality of identical decks placed on top of each other. Two cassettes 9 illustrated by broken lines are slid from opposite sides into such a deck up to the abutment 7. The cassette is thereby held between bar elements 1 of subsequent decks arranged over each other because the height of the bar element 1 amounts to a little more than the height of the cassette 9. In the deck following the first deck in the upwards direction the cassettes are slid in from a direction of the deck next below. Accordingly, slid-in compartments 11 are present in a rack 10 according to FIG. 6 between every two respective bar elements arranged above each other. Due to this structure it follows that each bar element in the tower-like rack 10 having a square base outline forms a cassette-supporting surface and simultaneously one of two lateral limiting surfaces for the regarding height adjacent lower slide-in compartment 11 arranged "at a right angle".

In order to facilitate the sliding-in of the cassette between two bar members and to avoid a damage, the outer longitudinal side 12 of each bar member 1 is designed rounded off in accordance with the cross-sectional view of FIG. 3, such that the cassette is guided easily into the slide-in compartment. Because slide-in compartments 11 are present at all four sides of the tower-like rack 10, the rack is mounted on the turntable 8 such that all sides of the rack are conveniently accessible.

Besides a tower-like rack which is square in plan view it is also possible to form by means of the bar elements 1 an arbitrarily differently shaped rack 14 according to FIG. 7 and 7a filling out a shelf of a furniture in its width, which then, however, is no longer accessible from all sides. Here, the bar elements 1 set upon each other form a wall which is alternately oppositely angled at the plug-in locations 4, 5 which then has a zig-zag shape and has for instance in front of a wall of a shelf such a distance that the cassettes slid in between the bar elements touch the wall of the shelf as abutment in order not to be pushed through at the rear. The cassettes are held only by the lower and upper bar element.

At the ends of the wall the bar elements 1 are interconnected by short intermediate pieces 15 having pin and bore and set inbetween two respective bar elements 1. There are a great many possibilities of shaping a rack of this kind.

The assembling of a rack 10 according to FIG. 6 proceeds by exclusively identical bar elements 1, thus there are no single right and left elements which allows an economical production. This building kit system allows specifically to produce a rack with any arbitrary height adjusted to the prevailing space conditions such as for instance in a shelf extremely economically by oneself. A not illustrated cover is placed onto the uppermost deck of bar elements, which is designed such as the turntable 8 but includes bores instead of pins.

Figure 12:
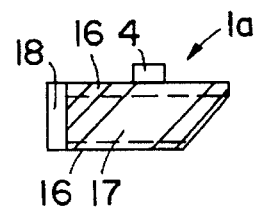
FIG. 12 a section through the bar element according to line 12—12 in FIG. 10.
Figure 11:
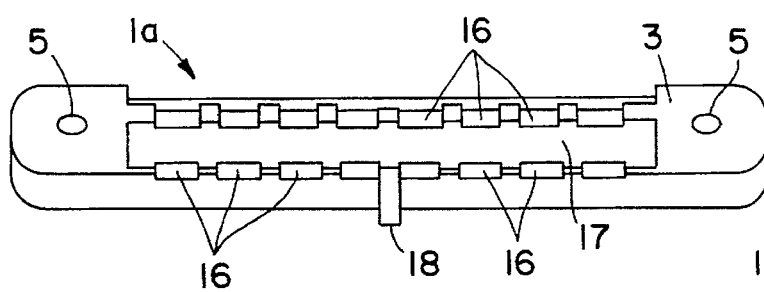
FIG. 11 the bar element of FIG. 10 in a perspective view from below.
Figure 13:
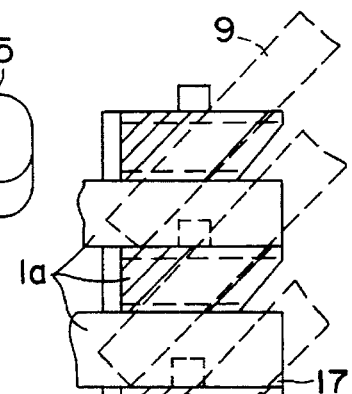
FIG. 13 a cut-out of a rack corner of bar elements with oblique slots for cassettes.

A modified embodiment of the bar element is illustrated in FIG. 10 to FIG. 12. This bar element 1a includes a continuous slot 17 extending from the outside, from the upper side 2 obliquely, preferably at an angle of 45° downwards towards the lower side and having an inside width of a cassette 9 intended for a obliquely standing storing in the slot 17. The arrangement of the oblique cassettes is disclosed in FIG. 13 which illustrates cut-out wise a vertical section through one side of a tower like rack 10 formed by the bar elements 1a.

Figure 14:
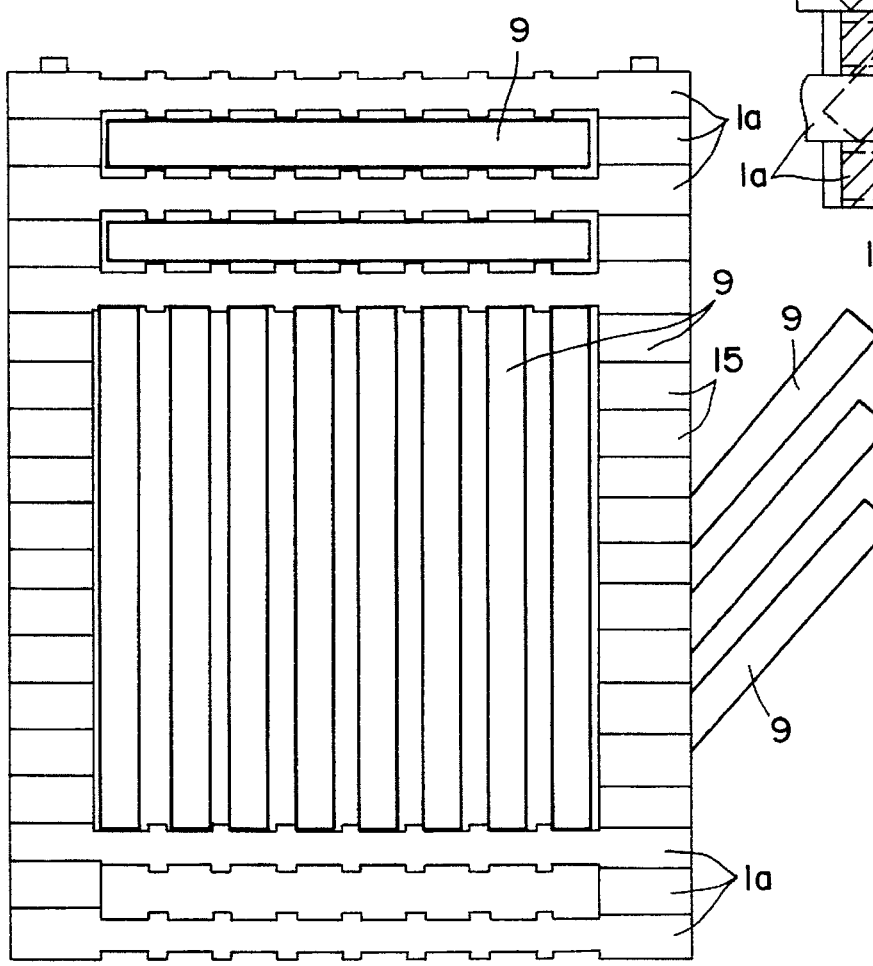
FIG. 14 a side view of a tower-shaped rack of bar elements according to FIG. 10, with a rack window for cassettes to be stored upright.

This bar element 1a includes, furthermore, groove shaped recesses 16 extending transversely at same distances in the upper side 2 and the lower side 3 for a separate guiding and lateral supporting of cassettes 9 which are placed for a upright standing storing between two bar elements 1a defining a window like recess in the rack 10 at the top and the bottom such as illustrated in the side view of a rack according to FIG. 14. The window like recess is formed by a deleting of bar elements at one side of the rack whilst the bar elements 1a at the sides of the rack extending perpendicularly thereto are inter-connected by intermediate pieces 15 according to FIG. 8 and 9. FIG. 14 illustrates all three different possibilities of storage modes of cassettes in the tower-like rack, i.e. the horizontally lying, the upright standing and the oblique arrangement.

The abutment for the limiting of the sliding-in path of the cassettes to be stored horizontally is formed by a rib 18 projecting opposite of the inner narrow side 6.

The bar elements consisting of a plastic material are suitably coloured differently, for instance red, yellow, blue, etc., such that the user can assemble a rack for a fast optical detecting and as desired with differently coloured sides such as, e.g., a red side for cassettes with light music, a green side for cassettes with classical music, etc. The bar elements can consist, however, also of wood or another suitable material. Furthermore, a not illustrated small ledge frame can preferably be formed at the plastic material at a side of the bar element facing towards the outside for receipt of an exchangeable identification plate.

The bar elements which consist of a plastic material have no sharp edges which often cause a danger of injury at plastic articles, for which reason the cassettes can not be scratched, and due to the plastic material the rack has a low weight.

For cassettes which are larger in height, containing two CD-disks also called album, the slide-in compartment 11 must be somewhat higher, for which reason two separate planar intermediate discs, similar to the intermediate pieces 15, can be inserted at the area of the pins 4 between two bar elements 1, which is not illustrated. Thus, one is not restricted to a size of a cassette. The term cassette is applicable generally besides music discs also, e.g., for CD-ROM discs.

With a corresponding different dimensioning of the bar elements this building kit system can obviously be also used for smaller tape record cassettes such as also discettes or for other square shaped bodies having the same size.

I claim:

1. A storage device for cassettes which comprises:
   a plurality of bar elements, each bar element defining opposite ends and connection means near each of said opposite ends to interconnect with a connection means of an adjacent bar element, said plurality of bar elements being interconnected by said connection means to provide vertically-spaced, generally rectangular compartments into which said cassettes can be slid for storage.

2. A storage device according to claim 1, wherein each bar element defines opposite upper and lower flat sides, and wherein each said connection means near each opposite end of a said bar element comprises a pin extending away from one of said upper and lower sides and a bore extending into a second of said upper and lower sides, each pin and bore of a connection means being axially aligned with one another.

3. A storage device according to claim 2, wherein each bar element comprises an obliquely angled, cassette-receiving slot extending from said upper side to said lower side.

4. A storage device according to claim 3, wherein said oblique angle is 45°.

5. A storage device according to claim 1, wherein four of said bar elements are interconnected to provide a rectangular deck and wherein a plurality of decks are mounted on one another to provide a tower rack.

6. A storage device according to claim 5, wherein each rectangular deck comprises first and second bar elements positioned in parallel and third and fourth transverse bar elements respectively connected to corresponding ends of said first and second bar elements, the tower rack providing slide-in compartments on four sides.

7. A storage device according to claim 6, wherein each bar element defines opposite inner and outer sides, said outer side being chamfered to facilitate sliding of said cassettes into said compartments.

8. A storage device according to claim 7, wherein said inner sides of said bar elements are stepped in their length dimension to provide a stop for a cassette positioned in a respective compartment.

9. A storage device according to claim 6, wherein the upper and lower sides of each bar element defines a plurality of equally spaced transverse grooves which enable cassettes to be vertically-positioned between two of said bar elements which are horizontally oriented above one another.

10. A storage device according to claim 1, wherein said plurality of bar elements are interconnected by said connection means to provide a zig-zag wall, and including connecting pieces having plug-in connection means interconnecting ends of adjacent bar elements at opposite free ends of said wall.

11. A storage device according to claim 1, wherein said bar elements are made of variously colored plastic.

12. A storage device according to claim 1, including a rotating platform on which said bar elements are positioned.

13. A bar element for use in constructing a storage device for cassettes, said bar element comprising upper and lower flat sides and opposite ends, pins which extend away from one of said upper and lower flat sides near said opposite ends and bores which extend into another of said upper and lower sides near said opposite ends and so as to be axially aligned with respective pins.

14. A bar element according to claim 13, including an obliquely-angled, cassette-receiving slot which extends from said upper side to said lower side.

15. A bar element according to claim 14, including equally-spaced transverse grooves in said upper and lower sides to enable cassettes to be vertically positioned between two said bar elements when horizontally oriented above one another.

* * * * *